United States Patent [19]
Scheufler, Jr.

[11] Patent Number: 6,033,161
[45] Date of Patent: Mar. 7, 2000

[54] REVOLVING PILOT TOOL

[76] Inventor: Richard A. Scheufler, Jr., 3207 Hartland Center Rd., Collins, Ohio 44826

[21] Appl. No.: 09/140,909

[22] Filed: Aug. 27, 1998

[51] Int. Cl.[7] .................................................. B23B 51/00
[52] U.S. Cl. .............................. 408/201; 408/16; 408/81; 408/82; 408/83; 408/225
[58] Field of Search ................... 408/16, 80–83, 408/83.5, 196, 201, 209, 225

[56] References Cited

U.S. PATENT DOCUMENTS

| | | | |
|---|---|---|---|
| 897,041 | 8/1908 | Weller | 408/82 |
| 2,009,168 | 7/1935 | Dettmer | 408/201 |
| 3,020,786 | 2/1962 | De Graffenried et al. | 408/16 |
| 3,088,202 | 5/1963 | Murray | 408/82 |
| 5,052,864 | 10/1991 | Shaw et al. | 408/201 |

FOREIGN PATENT DOCUMENTS

1386376  7/1988  U.S.S.R. .................................. 408/16

*Primary Examiner*—Steven C. Bishop
*Attorney, Agent, or Firm*—Jerry Semer

[57] ABSTRACT

The invention is a revolving pilot tool. The inventor's revolving pilot has a cylindrical shank which is attached to the tool usually in the center of the bottom of the tool. This shank has a threaded opening in its center. Over the shank is placed a cylindrical bearing. Over this bearing is placed another cylindrical piece that forms the outer surface of the pilot. To hold the bearing and the cylindrical piece upon the shank a screw and o-ring is usually used. This pilot is usually attached to the bottom of the tool to align the tool to an already drilled opening. However, it could be attached above a drill to align the tool to an opening being drilled. The pilot can also align the tool during line boring.

19 Claims, 9 Drawing Sheets

REVOLVING PILOT TOOL

FIELD OF THE INVENTION

This invention relates to a pilot and especially a rotating pilot.

BACKGROUND OF THE INVENTION

Pilots are usually used in connection with counterbores. Counterbores are tools usually made of steel, with either carbide or ceramic inserts. They will have ground edges or edges with inserted cutting bits secured in a way as to cut readily as you apply pressure, usually in a vertical motion or motion opposite the cutting edge. Counterboring is usually a secondary operation proceeding a drilling operation. However, a drill insert could also be a counterbore. The job of the counterbore tool is to bore a flat bottom hole larger than the pilot or spot face with or without a chamfer. The counterbore currently used is a single or a multi-edged cutting tool that rotates about and uses a pilot to guide at the cutting edge end.

Usually, this pilot is either fixed, or built into the tool, or in some applications replaceable. The main problem with pilots is that they wear quickly in high volume manufacturing. When this happens, control of the center line of your geometry or spectrum is lost. Thus, one of the objectives of this invention is to create a pilot that has a longer wear life, especially in high volume manufacturing. Another problem is that when the pilot is built into the tool and gets worn to the point no one can no longer make an accurate location of the opening to the bore, you must dispose of the whole tool. Among other problems, the pilot tends to break off at the stem resulting in extra cost in accuracy and lost productivity. Thus, one of the objectives of this invention is to build a pilot that, when worn, can be replaced easily without causing the whole tool to be damaged.

The revolving pilot, however, can be used in connection with different cutting tools such as chamfers, radii etc. The revolving pilot can be used with any tool in which an implement is placed in an opening to maintain the position of the tool. The pilot can be designed to be used as a belting pilot drilled to fit in openings that are not yet drilled. Although the revolving pilot is usually on the end of the tool, it could also be used in the middle or other areas in order to maintain the tools position or alignment to bore when line boring; thus will be a revolving guide.

The feature that achieves these objectives are that the pilot is actually made of only five components. These components are replaceable, thus, if any one of the components wears out, one can easily replace the component and not have to throw out the whole tool. The component that usually wears the most and is replaced the most, is the bearing.

SUMMARY OF THE INVENTION

The invention is a revolving pilot tool. The inventor's revolving pilot has a cylindrical shank which is attached to the tool usually in the center of the bottom of the tool. This shank has a threaded opening in its center. Over the shank is placed a cylindrical bearing. Over this bearing is placed another cylindrical piece that forms the outer surface of the pilot. To hold the bearing and the cylindrical piece upon the shank a screw and o-ring is usually used. This pilot is usually attached to the bottom of the tool to align the tool to an already drilled opening. However, it could be attached above a drill to align the tool to an opening being drilled. The pilot can also align the tool during line boring.

DETAILED DESCRIPTION OF THE INVENTION

Figure 1:
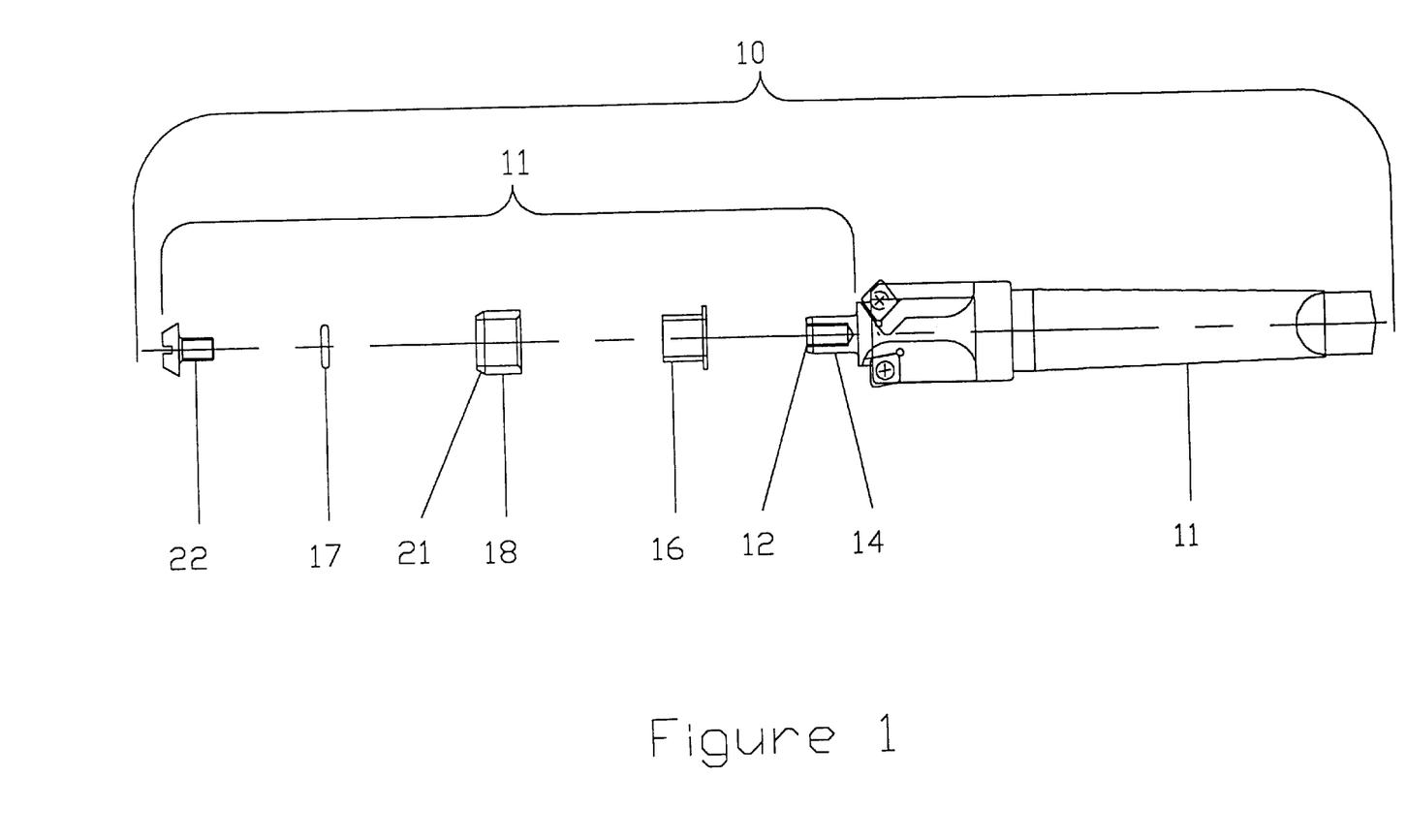
FIG. 1 is an exploded view of the invention.
Figure 2:
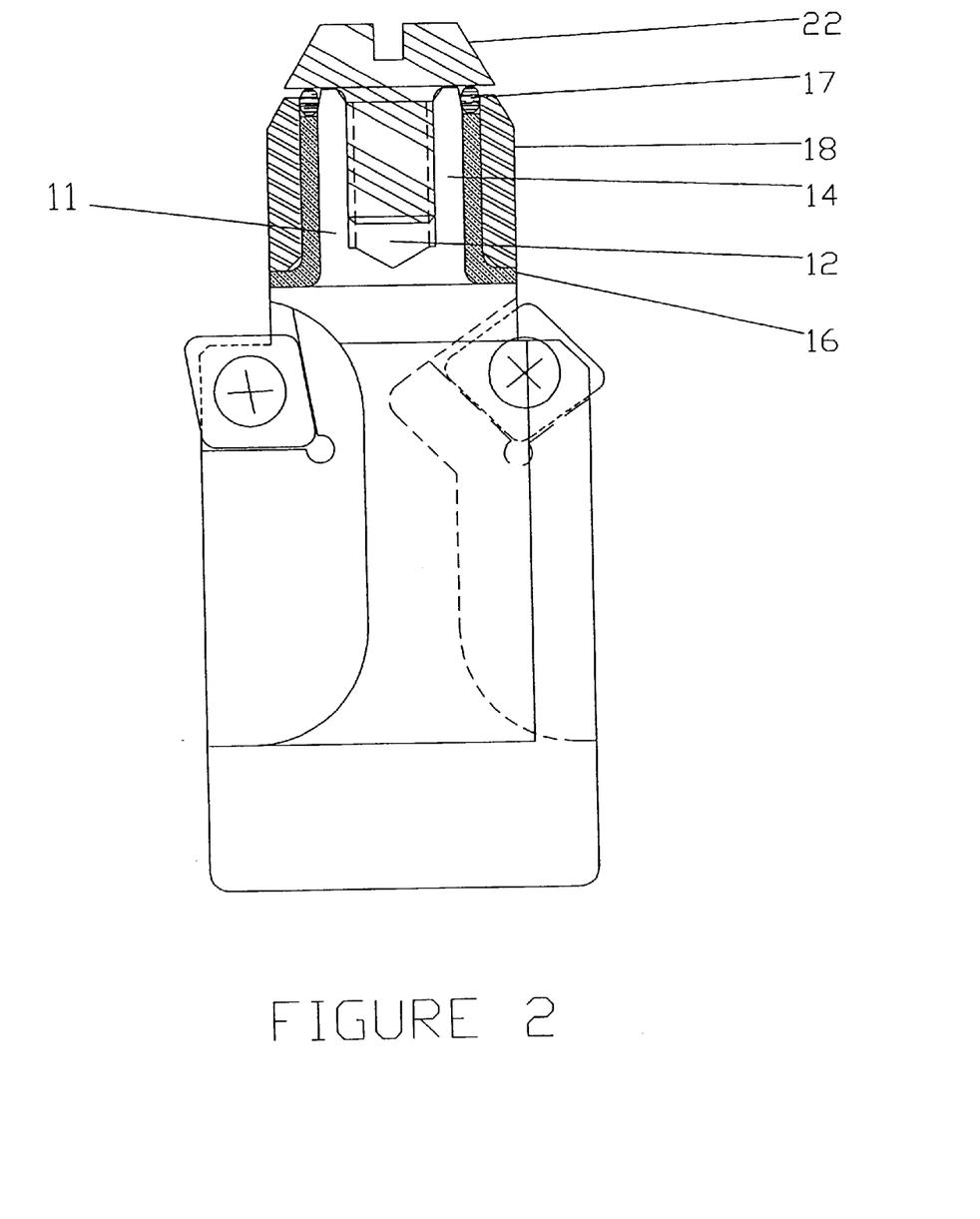
FIG. 2 is a cutaway view of the invention.

FIG. 1 is an exploded view of the inventor's new design for the pilot on a counterbore. FIG. 1 shows the inventor's revolving pilot 11. The inventor's revolving pilot 11 has a cylindrical shank 14, which, in this embodiment is attached to a counterbore 10 in the center of the bottom of the tool body 15. This shank 14 has a threaded opening 12 in its center that is threaded. Over the shank 14 is placed a bearing 16. The bearing 16 is approximately the same length as the shank 14 and it is shouldered outward at the top to form a small ridge. Over the bearing 16 is placed another cylindrical piece 18 that forms the outer surface of the pilot. In the preferred embodiment, cylindrical piece 18 and bearing 16 together are 0.010 to 0.015 inches less than the shank 14 length. The bottom edge 21 of the cylindrical piece 18 is tapered and the bottom is left open. Next, one places an o-ring 17 within the cylindrical piece 18, and then threads a screw 22 with a wide head into the threaded opening in the shank 14 to hold the pilot 11 in place. The o-ring 17 is squeezed into the area between the screw 22 and the bearing 16 top surface as shown in FIG. 2. The screw 22 has a wide head of which the dimension is nearly as large as the outer diameter of the cylindrical piece in order to hold the plates of pilot 11 together. The downward pressure caused by tightening the screws 22 on the o-ring 17 force the bearing's face against the shank 14, which eliminates dirt from being able to penetrate this area.

Figure 6:
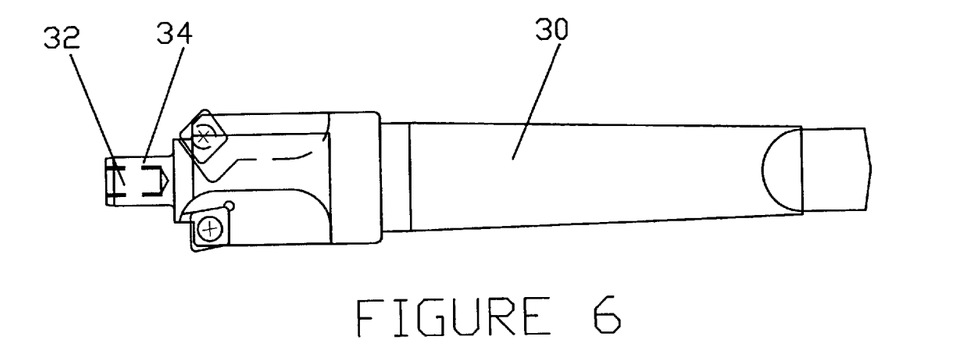
FIG. 6 is a plan view of the tool of FIG. 5 with a threaded opening in the bottom of the shank.
Figure 7:
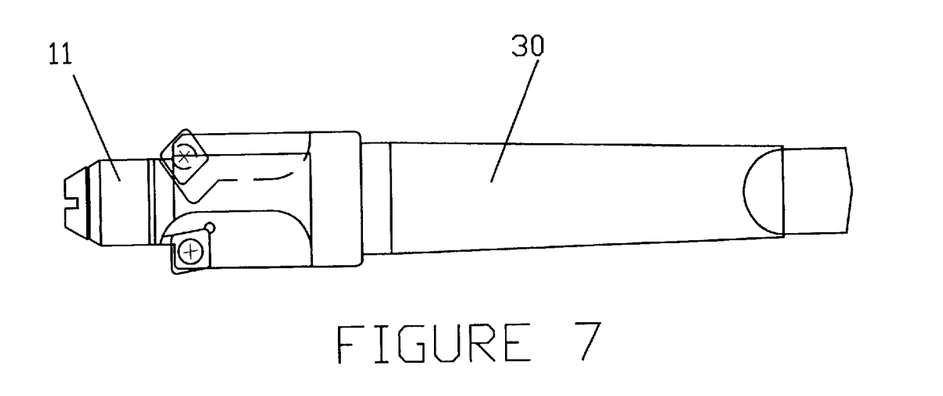
FIG. 7 is the tool of FIG. 6 with the invention attached.

A new style counterbore with revolving pilot can be produced by the following method. One starts with a regular tool body 15 and places a shank 14 protruding from its bottom where the pilot is usually placed. This shank 14 is cylindrical in shape and has a threaded opening 12 through its center. This shank 14 will be of lesser size then the state of the art of pilots. The shank 14 should be ground to a very smooth finish such as an 8–16 microfinish and hardened to the same degree as the counterbore tool. Next one has a cylindrical piece 18 that is the outer surface of the pilot 11. This cylindrical piece 18, as with the regular pilot, has an outer diameter which is approximately 0.001 inch to 0.0015 inches less than the minimum geometry of the drilled hole size diameter. The cylindrical piece 18 should be made out of material that is wear resistant and hard. Pressed onto the cylindrical piece 18 is a bearing 16. The bearing 16 is cylindrical in shape and has a channel down it's middle of approximately the size of the shank 14. The bearing 16 has on its bottom a ridge that extends out from its bottom. The cylindrical piece 18 is pressed over the bearing 16 and both pieces are placed over the shank 14. To hold these pieces in position a screw 22 with a wide head as shown in FIG. 6 is threaded into the threaded opening 12 of the shank 14. Also, to keep dirt out of the assembly, an o-ring 17 is placed over the assembly and the screw 22 clasps or squeezes the o-ring 17 into the area between the screw 22 and the bearing 16 and forces the bearing space against the shank's 14 collar. This is effective at keeping dirt out and causing the pilot 11 to last longer. The designer of the tool must take into consideration the shrinking of all the parts to insure proper fit. The basic advantage of this system is that the bearing 16 is the item that wears and when it is worn out one can just remove the screw 22, pull out the bearing 16, and stick in another bearing 16 and screw it in. There is no necessity to replace the whole pilot 11 or the whole tool.

Figure 8:
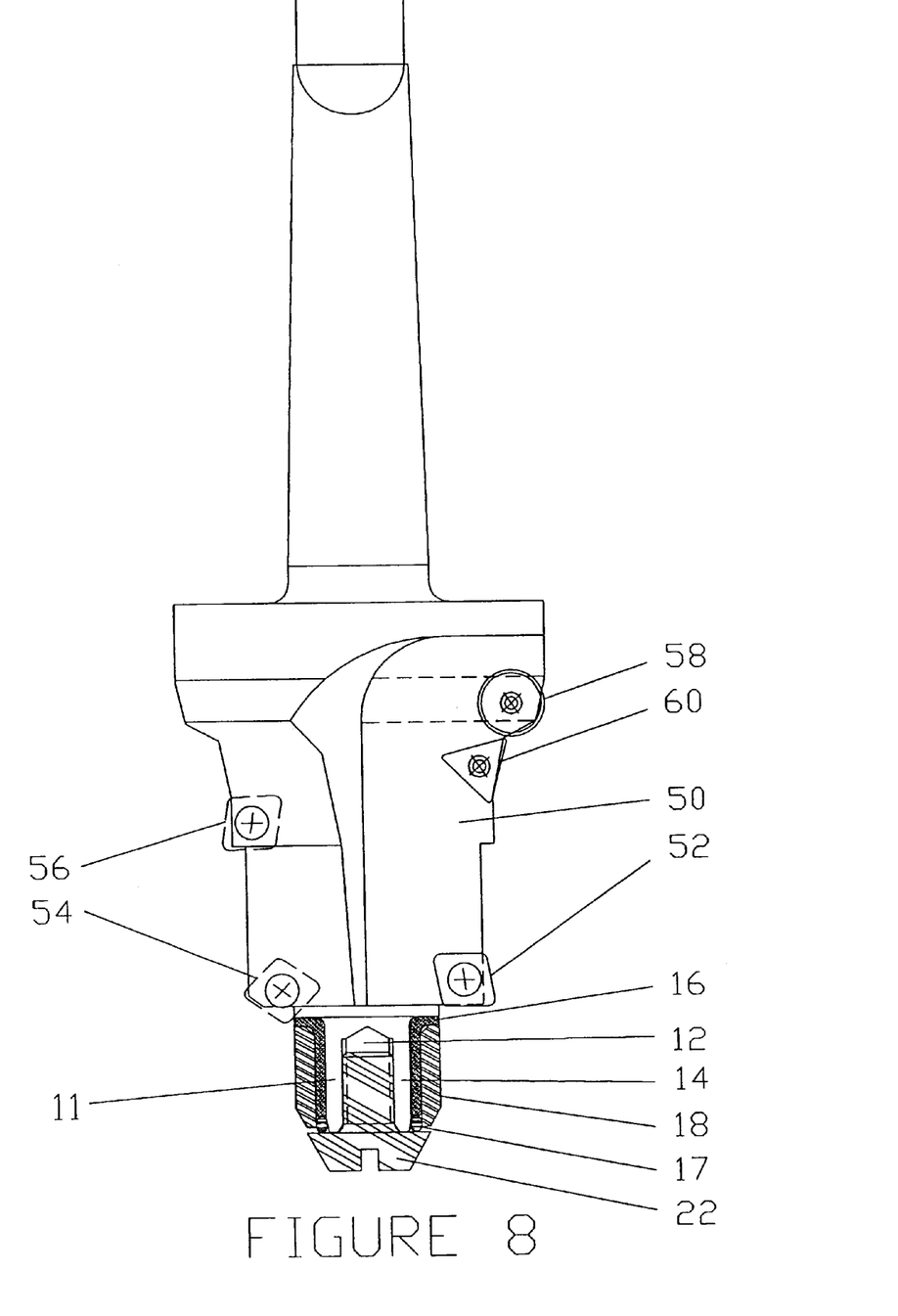
FIG. 8 is the invention attached to a tool with more than one cutting edge.

The revolving pilot 11 can be used with other tools. FIG. 8 shows the pilot used with many implements on the same tool. In FIG. 8 the pilot 11 is again placed in the center on the end of the tool 50. This pilot is exactly the same and is created exactly the same as the revolving pilot in the previous embodiment. The pilot has a shank 14 with a threaded opening 12 in the center. Over the shank 14 is placed a bearing 16. Over the bearing 16 is placed a cylindrical piece 18. The bearing 16 and the cylindrical piece 18 are exactly the same in size and shape as the bearing 16 and cylindrical piece 18 of the previous embodiment shown in FIG. 1. A screw 22 and o-ring 17 are used to tighten the bearing 16 against the shank 14 and holds the pilot 11 together. The cutting tool in the embodiment of FIG. 8 has several cutting edges. It has a counterbore 52, an inside camber 54, an outside camber 56, a radius 58 and lead angle side 60. All these tools are aligned with revolving pilot 11. As in the previous example, it is the bearing 16 that wears out. When it's worn, it can be replaced and there is no necessity to throw out the whole tool.

Figure 3:
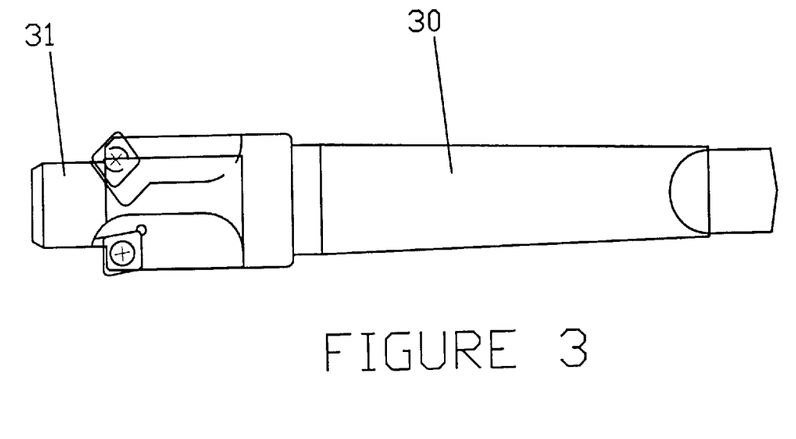
FIG. 3 is a plan view of a counterbore with pilot that is presently on the market.
Figure 4:
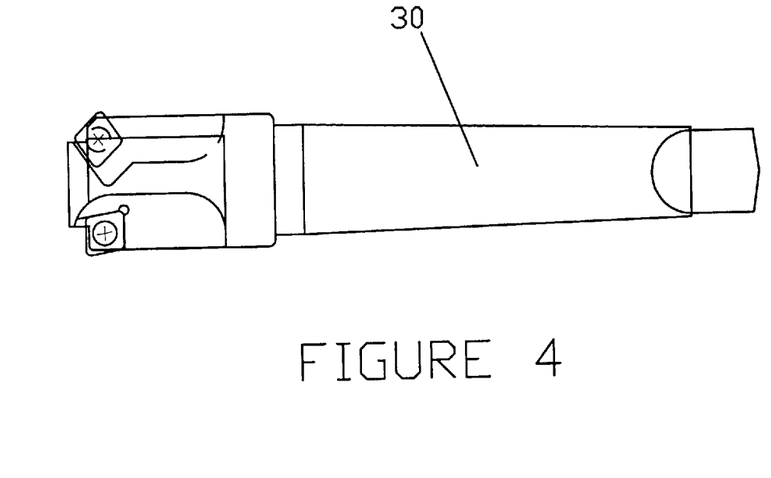
FIG. 4 is a plan view of the counterbore of FIG. 3 with a pilot removed.
Figure 5:
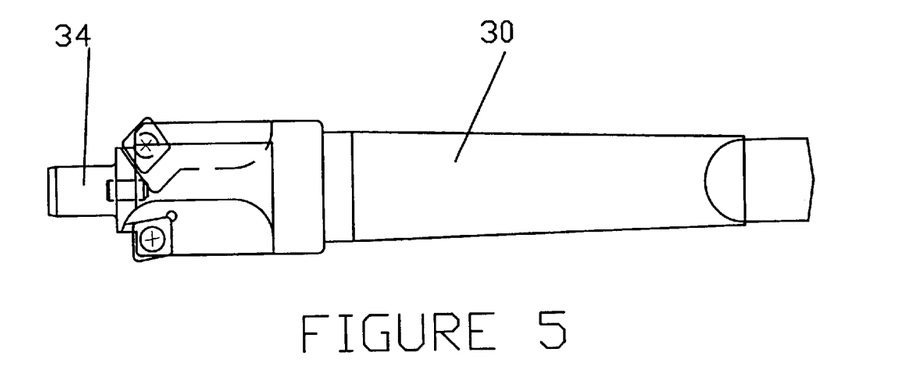
FIG. 5 is a plan view of the counterbore of FIG. 4 with a shank placed where the old pilot was removed.

A counterbore 10 with revolving pilot 11 can also be produced from counterbores presently on the market that have pilots attached by the following method shown in FIGS. 3 through 7. FIG. 3 shows the counterbore 30 that presently can be purchased on the market with the pilot 31 attached. FIG. 4 shows the counterbore 30 after the pilot 31 has been removed. To get to this step, one should anneal the counterbore 30 and then machine off the pilot 31. The next step shown in FIG. 5 is attaching a rough shank 34 to the tool. This rough shank 34 should be made of the same material and located with a dowel pin that is bolted into the bottom of the counterbore 30 where the pilot 31 has been removed and replaced with a fake carbon insert. This fake carbon insert protects the insert cavity from welding. The rough shank 34 should be made of the same material as the counterbore 30. Then the rough shank 34 is welded to the counterbore 30. The tool is then again annealed and the new shank 34 is machined to the proper dimension. A threaded opening 32 is also placed in the bottom end of the shank 34 as shown in FIG. 6. The revolving pilot is then placed on the end of the counterbore 10. First the bearing 16 is placed with the camber end over the shank 34 and against the counterbore 30. Then the cylindrical piece 18 is placed upon the shank 34 over the bearing 16. An O-ring 20 is then placed in the bottom end of the assembly and a screw 22, which threads into the opening 32, in the shank 34 holds the whole assembly together.

Figure 9:
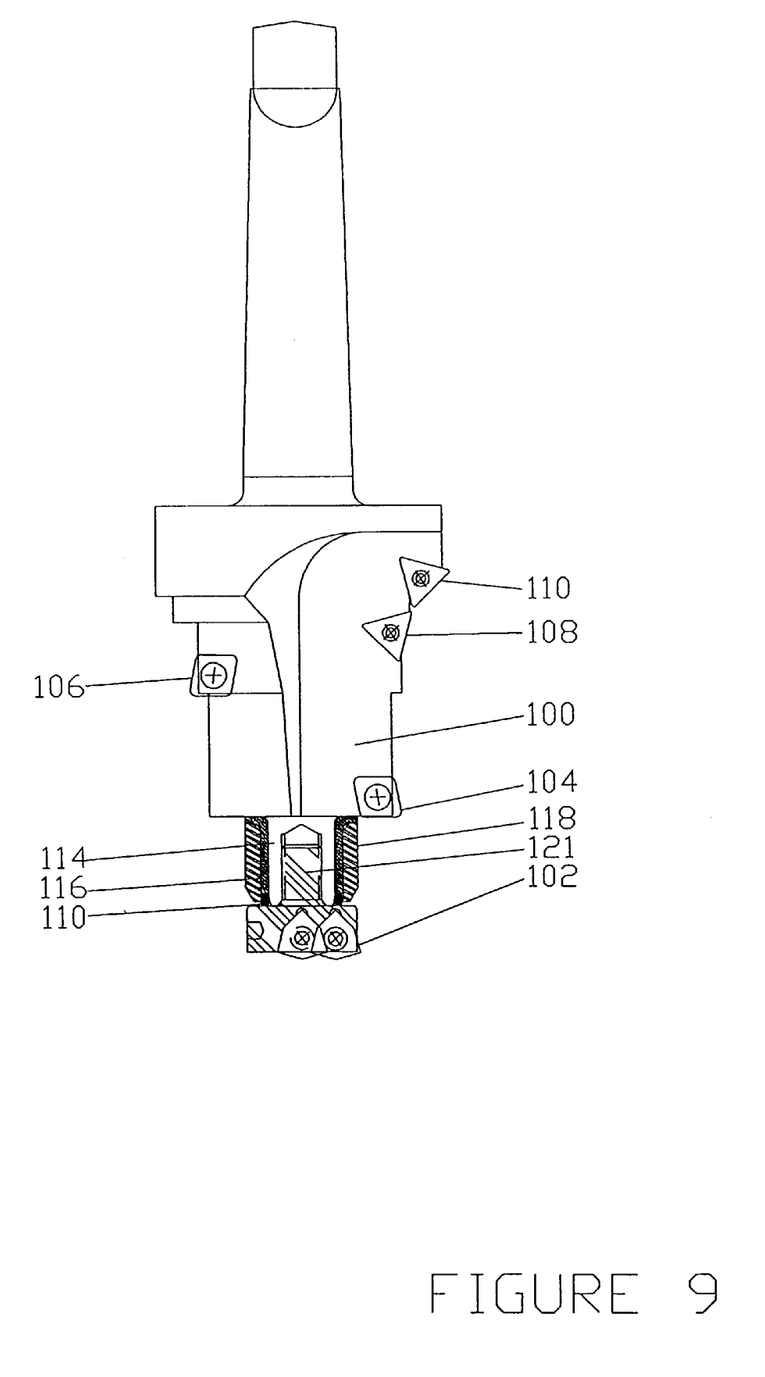
FIG. 9 is a view of the invention attached to a tool where the invention is above a cutting implement.

FIG. 9 shows an embodiment of the pilot used on a tool in which the pilot is not used on the end of the tool. In this embodiment the pilot is above the drill 102 at the end of the tool. This embodiment shows the use of the pilot on a drill. This also shows the use of the pilot on a tool that has many different cutting edges which are cutting at different geometries. FIG. 9 shows the tool body 100. On the tool's body 100 are several cutting edges. On the tool is the drill 102, a C-bore 104, a bore 106, a lead 108 and a chamfer 110. FIG. 9 shows the tool with the revolving pilot similar to the revolving pilot of the previous embodiment. This revolving pilot has the shank 114 of which the bearing 116 and the outer cylinder 118 are placed over. In this embodiment the shank 114, the bearing 116, and the outer cylinder 118 are similar to the shank 14, the bearing 16 and the outer cylinder 18 of the previous embodiment. The outer cylinder 118 and the bearing 116 are placed over the shank 114 and an O ring or washer 117 are placed on top of the bearing 116, then the drill piece 102 is threaded into the threaded opening 121 of the shank 114. The drill piece 102 applies pressure upon the O-ring or washer 117 and squeezes into the area between the tool and the body pieces to ensure that no dirt can get within.

Figure 10:
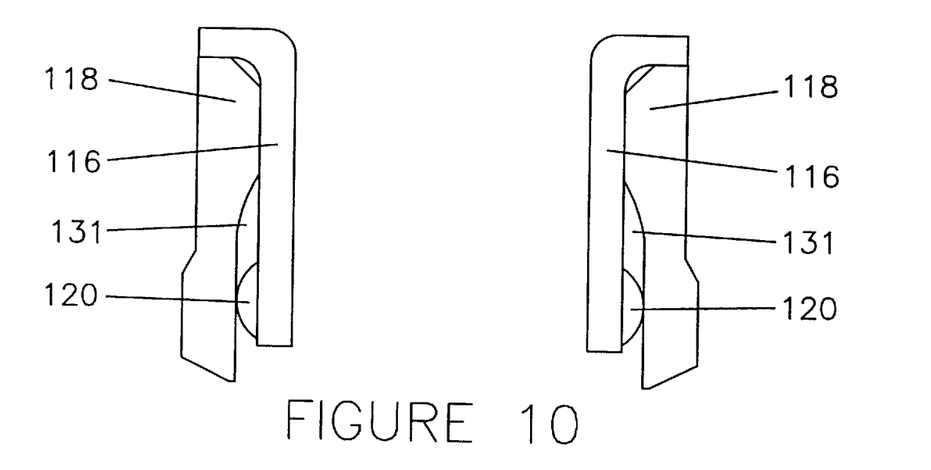
FIG. 10 is a cutaway view of another embodiment of the bearing and cylindrical piece of the invention.
Figure 11:
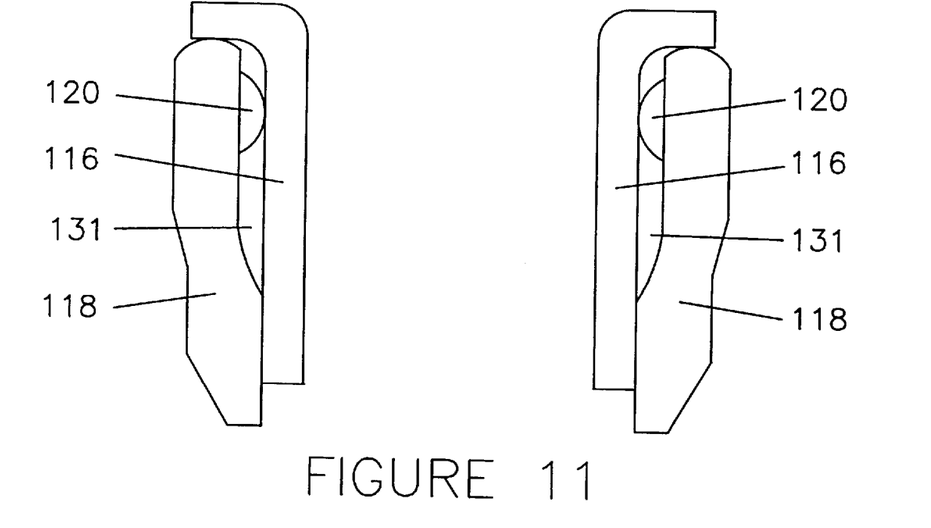
FIG. 11 is a cutaway view of another embodiment of the bearing and cylindrical piece of the invention.

FIG. 10 and 11 show that the outer cylinder 118 can be made in different configurations. In these embodiments the bearing 116 and the shank 114 are exactly as they were in the previous embodiment. In this embodiment, the outer cylinder 118 is made of a spring steel and will flex relative to the size of the hole. In FIG. 10, the outer cylinder's 118 end portion that is closest to the drill is formed with a space between it and the bearing 116. Also, the lead edge of the outer cylinder 118 is tapered so that when it fits within the opening, it will flex inward as to the size of the opening. Within the open area 131 between the bearing 116 and the outer cylinder 118, a sensor 122 for heat, movement or pressure, or a load cell which measures the amount of flex of the outer cylinder 118 and can indicate the diameter of the opening being drilled. FIG. 11 shows another design for the outer cylinder 118. In this design the end furthest away from the drill is beveled outward and there is an open area 121 between the outer cylinder 118 and the bearing 116. Also the lead edge of the outer cylinder 118 is tapered. As in the previous embodiment, this allows the outer cylinder 118 to spring in and out according to the size of the opening. Within this open area, as in the previous embodiment, a sensor 120 for heat, pressure or movement, or load cell can be placed thus enabling the operator to measure the size of the bore. This information would also tell the operator how the drill bits are wearing.

Figure 12:
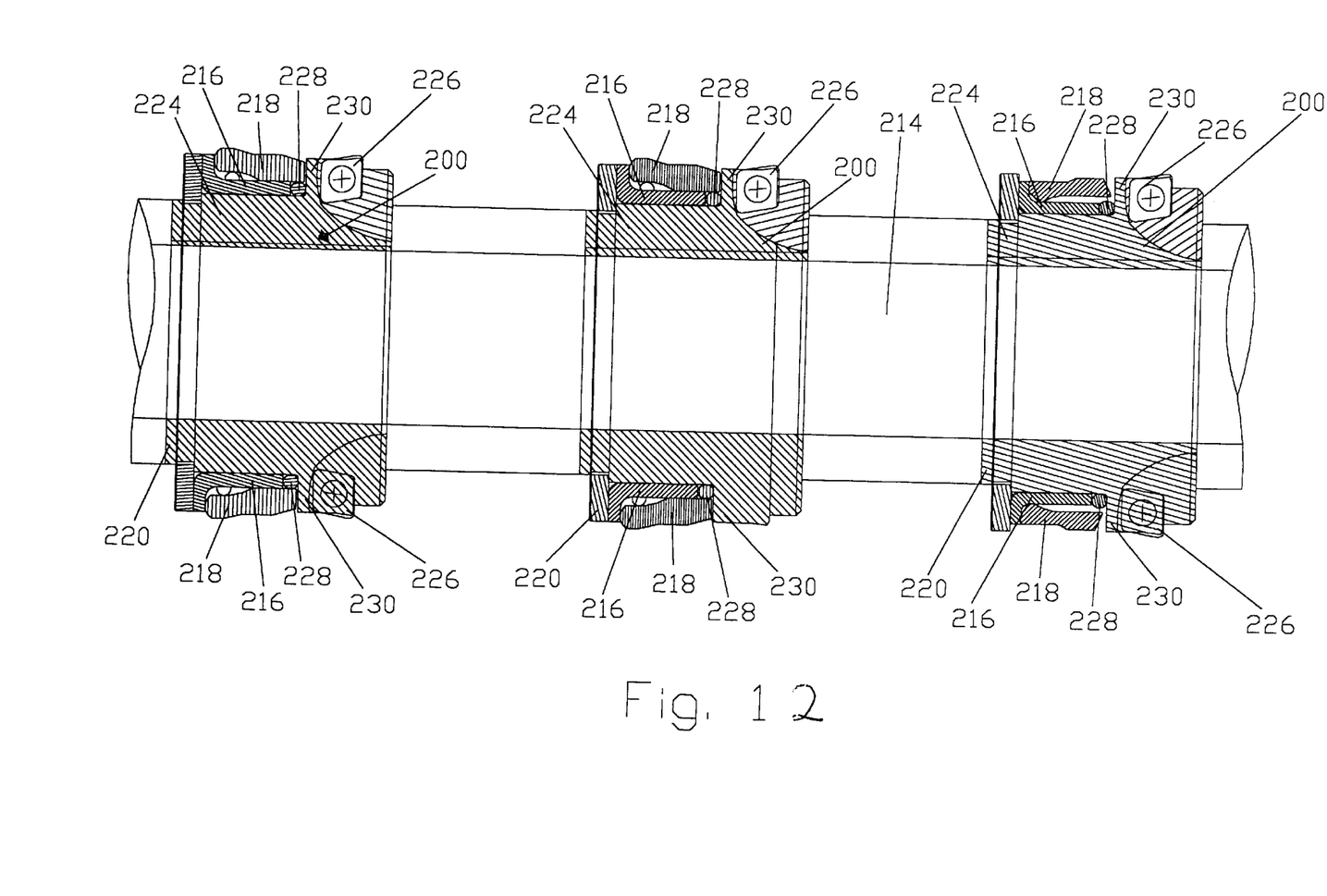
FIG. 12 is a view of another embodiment of the invention being used for line boring.
Figure 13:
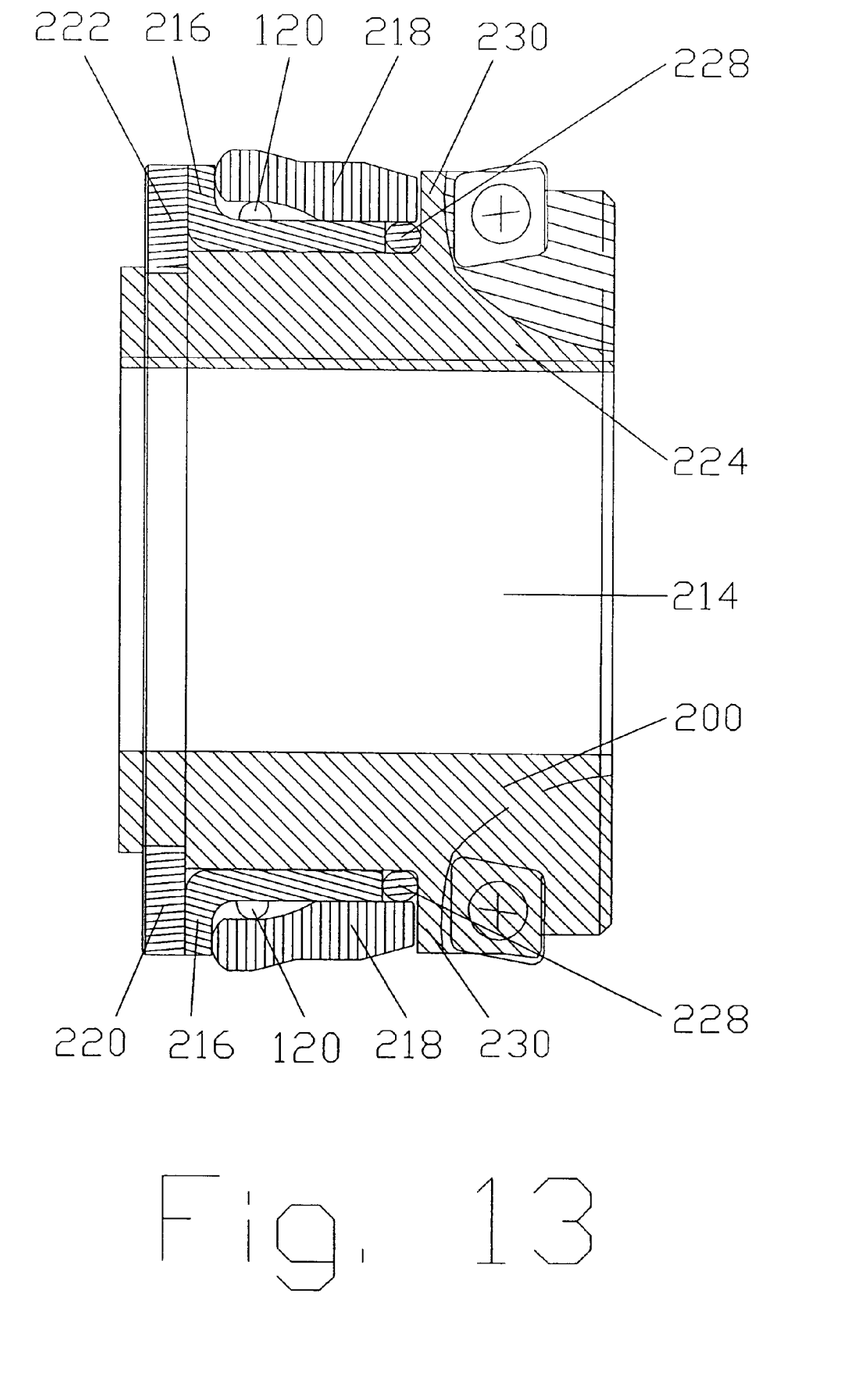
FIG. 13 is a cutaway view of the embodiment to the invention being used for line boring.

FIG. 12 shows three of the revolving pilots 200 on a line bore. These pilots 200 are basically the same as the pilots of the previous embodiments except for a line bore there is no shank. Running down the middle of the pilot 200 is the shaft 214 of the line bore. In this configuration shown in both FIG. 12 and 13, one sees the shaft 214 running through center of the revolving pilot 200. The revolving pilot 200 is placed on the shaft 214 by the following method. First, the shoulder ring 220 is slid on the shaft 214. When the shoulder ring 220 is in the proper position on the shaft 214, it is tightened into the position by tightening the set screw 222 against the shaft 214. Then the revolving pilot 200 is place over the shaft 214 and moved to the shoulder ring 220. The revolving pilot 200 is created as follows: Body piece 224 is cylindrical in shape with an opening in its center which is adapted to fit over the shaft 214. The body piece 224 is cantilever in shaper and on the side of the projecting structure 230 are the cutting inserts 226. There can be one insert 226 as shown in FIG. 12, or more shown in FIGS. 12 and 13. Below the projecting structure 230 lies the pilot. It comprises an o-ring 228, a bearing 216, and a cylindrical piece 218. The o-ring 228 is placed around the body piece 224 and up against the projecting structure 230. Then, the bearing 216 is placed over the body piece 224 and against the o-ring 228. Bearing 216 has a shape similar to the shape of the bearing 116 or 16 in the previous embodiment. Bearing 216 is cylindrical and its inner dimension is slightly larger than the outer dimension of the body piece 224. The bearing 216 has a shoulder that fits against projecting structure 230. The outer cylinder 218 is placed over the bearing 216. The outer cylinder 218 is cylindrical in shape and, its inner diameter is slightly larger than the outer diameter of the bearing 216. Said pilot 200 as shown has the same structure as the pilot in FIG. 11. The pilot 200 has a sensor 110 between the bearing 216 and the outer cylinder 218 . Sensor 120 of this embodiment can be for heat, pressure or movement or a load cell. It enabled the operator to measure the size of the bore and how the cutting edges are wearing is in the previous embodiments.

Changes and modifications in the specificity described embodiments can be carried out without departing from the scope of the invention, which is intended to be limited only by the scope of the appending claims.

I claim:

1. A revolving pilot for a tool comprising:
   a. a cylindrical piece with an inner and outer diameter made out of material that is wear resistant and said outer diameter is the outer diameter of the pilot and said cylindrical piece has a top and bottom inner diameter and said cylindrical piece has a lead edge; and
   b. a bearing piece with a top and bottom and said bearing piece is cylindrical and made out of material that is wear resistant and said bearing piece fits within said cylindrical piece said bearing piece outer diameter is approximately the same as the inner diameter of the cylindrical piece and said bearing piece is shouldered outward; and,
   c. a means for attaching the cylindrical piece and the bearing piece to the tool.

2. A revolving pilot as in claim 1 wherein:
   a. the means for attaching the cylindrical piece and the bearing piece to the tool comprises:
      (1) a shank that is cylindrical and made out of material that is hard and wear resistant attached securely to the tool and has a threaded opening in its bottom end the shank has an outer diameter and said shank has a bottom and top end; and,
      (2) a screw adapted to be threaded within the threaded opening of the shank and said screw holds the cylindrical piece and the bearing on the shank.

3. A revolving pilot as in claim 2 further comprising:
   a. an o-ring that fits over the screw and when the screw is tightened into the threaded opening of the shank the o-ring collapses against the bearing to keep dirt from getting into the bearing and the shank so as to increase the bearing and the pilots life.

4. A revolving pilot as in claim 2 wherein:
   a. the bearing is approximately the same length as the shank.

5. A revolving pilot as in claim 2 produced from a counterbore with a non-revolving pilot by the following steps:

a. removing the pilot from a counterbore and pilot presently on the market; and,
   b. attaching a rough cylindrical shank to the end of the counterbore from which the pilot was removed; and,
   c. machining the cylindrical shank to the proper outer dimensions; and,
   d. machining a threaded opening in the bottom end of the shank; and,
   e. placing a bearing that is cylindrical over the shank that is approximately the same length of the shank and said bearing inner diameter is approximately the same as the shank's outer diameter; and,
   f. placing a cylindrical piece over the bearing and over the shank; and,
   g. threading a screw into the threaded opening in the shank to hold the bearing and cylindrical piece in place upon the shank.

6. A revolving pilot as in claim 5, which further comprises the step of:
   a. fitting an o-ring over the screw and when the screw is tightened into the treaded opening of the shank, the o-ring collapses against the bearing to keep dirt from getting into the bearing and cylindrical shank so as to increase the bearing and pilots life.

7. A revolving pilot as in claim 1 wherein:
   a. the tool has many implements.

8. A revolving pilot as in claim 1 further comprising:
   a. a shank with an outer diameter that is cylindrical made out of material that is hard and wear resistant and said shank has a bottom and top end, and the cylindrical shank is attached to the tool in the center of the bottom of the tool.

9. A revolving pilot for a tool comprising:
   a. a cylindrical piece with an inner and outer diameter made out of material that is wear resistant and said outer diameter is the outer diameter of the pilot and said cylindrical piece has a top and bottom inner diameter and said cylindrical piece has a lead edge; and
   b. a bearing piece with a top and bottom that is cylindrical and made out of material that is wear resistant and that fits within said cylindrical piece said bearing piece outer diameter is approximately the same as the top or bottom inner diameter of the cylindrical piece; and,
   c. a means for attaching the cylindrical piece and the bearing piece to the tool; and,
   d. the cylindrical piece bottom inner diameter is larger than the outer diameter of the bearing piece thus forming a cavity between the bearing and the cylindrical piece.

10. A revolving pilot as in claim 1 wherein:
    a. the lead end of the cylindrical piece is tapered.

11. A revolving pilot as in claim 9 further comprising:
    a. a sensing device is placed within the cavity formed by the cylindrical piece and the bearing.

12. A revolving pilot as in claim 1 wherein:
    a. the tool is a body piece which fits upon a shaft and said body piece has the implement attached and said tool lower portion is cylindrical.

13. A revolving pilot as in claim 12 wherein:
    a. the means for attaching the cylindrical piece and the bearing piece to the tool comprises:
       (1) the bearing piece fits over the cylindrical portion of the body piece; and,
       (2) the cylindrical piece fits over the bearing; and, (3) a shoulder ring is placed over the shaft and placed against the bearing piece; and, (4) a mean for holding the shoulder ring in place on the shaft.

14. A revolving pilot as in claim 13 further comprising:

a. an o-ring that fits over the cylindrical portion of the body piece, and when the shoulder ring is places against the bearing piece, the o-ring collapses against the bearing to keep dirt from getting into the bearing to increase the bearing and the pilot's life.

15. A revolving pilot for a tool comprising:

a. a cylindrical piece with an inner and outer diameter made out of material that is wear resistant and said outer diameter is the outer diameter of the pilot and said cylindrical piece has a top and bottom inner diameter and said cylindrical piece has a lead edge; and b. a bearing piece with a top and bottom that is cylindrical and made out of material that is wear resistant and that fits within said cylindrical piece said bearing piece outer diameter is approximately the same as the top or bottom inner diameter of the cylindrical piece; and, c. a means for attaching the cylindrical piece and the bearing piece to the tool; and, d. a shank with an outer diameter that is cylindrical made out of material that is wear resistant and said shank has a bottom and top end, and the cylindrical shank is attached to the tool in the center of the bottom of the tool and the cylindrical shank is attached to the tool above a cutting implement.

16. A revolving pilot as in claim 15 wherein:

a. the means for attaching the cylindrical piece and the bearing piece comprises:

(1) the cylindrical shank has a threaded opening in its bottom end; and, (2) the cutting implement has a threaded rod attached to it, and the threaded rod adapted to be threaded within the threaded opening of the cylindrical shank, said cutting implement, and threaded rod to hold the cylindrical piece and the bearing on the shank.

17. A revolving pilot as in claim 16 further comprising:

a. an o-ring that fits over the threaded rod, and when the cutting implement and threaded rod are tightened into the threaded opening of the cylindrical shank, the o-ring collapses against the bearing to keep dirt from getting into the bearing and the shank so as to increase the bearing and the pilot's life.

18. A revolving pilot for a tool comprising:

a. a cylindrical piece with an inner and outer diameter made out of material that is wear resistant and said outer diameter is the outer diameter of the pilot and said cylindrical piece has a top and bottom inner diameter and said cylindrical piece has a lead edge; and b. a bearing piece with a top and bottom that is cylindrical and made out of material that is wear resistant and that fits within said cylindrical piece said bearing piece outer diameter is approximately the same as the top or bottom inner diameter of the cylindrical piece, and, c. a means for attaching the cylindrical piece and the bearing piece to the tool; and, d. the cylindrical piece's top inner diameter is larger than the outer diameter of the bearing piece, thus forming a cavity between the bearing and the cylindrical piece.

19. A revolving pilot as in claim 18 further comprising:

a. a sensing device is placed within the cavity formed by the cylindrical piece and the bearing.

* * * * *